Feb. 13, 1940. C. SCHIVINC 2,190,195
TREADBOARD
Filed March 2, 1939
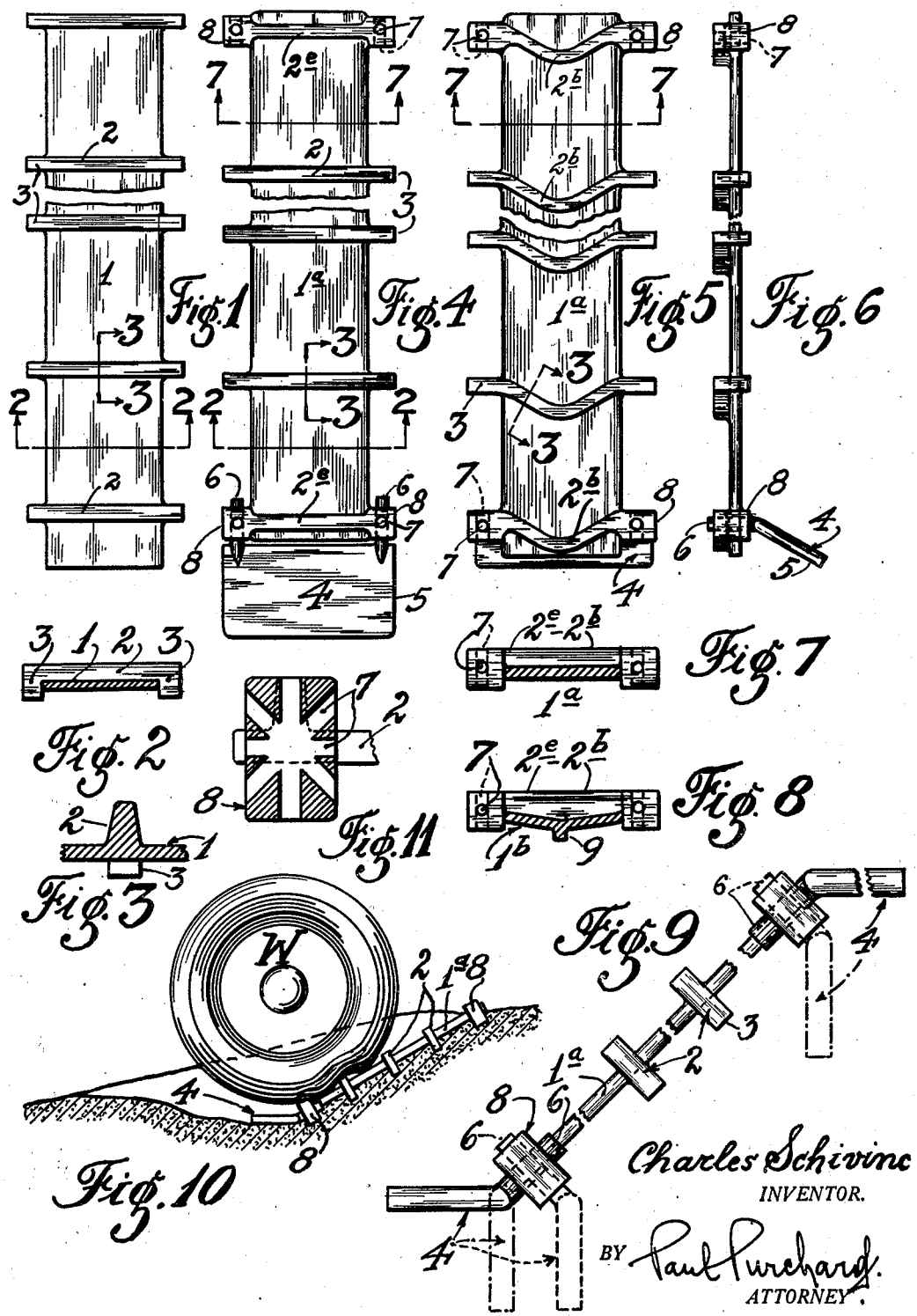

Patented Feb. 13, 1940

2,190,195

UNITED STATES PATENT OFFICE 2,190,195

TREADBOARD

Charles Schivinc, Millvale, Pa.

Application March 2, 1939, Serial No. 259,485

2 Claims. (Cl. 238—14)

This invention relates to non-skid treadboards intended to extricate automobiles and the like from road-ruts, or to help the former to start over slippery portions of a road where the automobile would otherwise skid.

One of the primary objects of this invention is to provide a rigid treadboard having suitable means, such as cleats, to offer a positive hold for the rubber tires of an automobile. Another object of this invention is to provide a treadboard of the character described having anchoring means whereby said board may be held in soft ground against longitudinal and lateral shifting, caused by the turning wheels of an automobile.

Still another object of this invention is to provide a rigid treadboard having auxiliary removable end-plates which may be promptly connected to either end of the main board, in different angularity thereto, to provide a better means for the wheels to climb on or off said treadboard.

Additional features and advantages of this invention will appear in the following description considered in connection with the accompanying drawing forming part of this application.

In the drawing:

Fig. 1 is a top plan view of the simplest embodiment of this invention.

Fig. 2 is a cross-sectional view taken substantially on line 2—2 in Figs. 1 and 4.

Fig. 3 is a fragmentary sectional view taken on line 3—3, in Figs. 1, 4 and 5.

Fig. 4 is a top plan view showing a treadboard supplied with a detachable auxiliary end-plate.

Fig. 5 is a top plan view showing a modified non-skid treadboard to which an auxiliary end-plate is also connected.

Fig. 6 is a side elevation of Fig. 5.

Fig. 7 is a cross-section taken on line 7—7 in Figs. 4 and 5.

Fig. 8 is a similar view showing a modified form of treadboard.

Fig. 9 is a fragmentary side elevation showing the treadboard with end-plates applied at both ends in various angular relations to the main body.

Fig. 10 is a diagrammatic view showing the wheel of an automobile being extricated out of a deep rut by means of my treadboard.

Fig. 11 is a sectional view through a modified connecting head for the treadboards shown in Figs. 4 and 5.

Reference being had to the drawing, the simplest embodiment of my invention, as shown in Figs. 1 to 3 inclusive, comprises a rigid board 1, of any suitable material, such as steel, malleable iron, aluminum, etc., to which are secured in any desired manner, such as by welding or integral casting, the transverse cleats 2 having at both ends extensions 3 protruding laterally as well as downwardly of the main body, to provide suitable anchoring means for the treadboard in the ground against longitudinal shifting of said board when subject to the action of the revolving wheels of an automobile. As shown, the treadboard is in this case assumed to be flat and of substantially rectangular cross-section, and the extensions 3 of the cleats may be carried down below the underside and outwardly of the main body any desired distance, to provide ample anchorage in the ground.

If desired, and as shown in Fig. 4 in particular, the treadboard $1^a$ may be arranged to receive at either end a removable auxiliary end-plate 4 comprising a flat plate 5 having secured thereto at both ends of one side the two dowels 6 adapted to engage either one of two or more sets of angularly disposed holes 7 provided in the connecting-heads 8 forming the extensions of the two end-cleats $2^e$ of the treadboard, the intermediate cleats 2 of which are straight and like those shown in Fig. 1.

The dowels 6 of the end-plate may be set in the plane of the latter, or they may be disposed at any desired angle thereto, as assumed in the drawing.

In Figs. 5 and 6 there is shown a treadboard similar to the one shown in Fig. 4, except that the transverse cleats $2^b$ are centrally curved and upwardly flared to the better center and hold the wheels on the treadboard. This modified construction is also assumed to have a flat main body $1^a$, as shown especially in Fig. 7. However, if desired, either one of the embodiments shown may have the main body dished downwardly along the longitudinal center line thereof, as at $1^b$, Fig. 8, to further assist in centering the wheels of a vehicle and also strengthen the board against bending. Also, a longitudinal rib 9, of any desired shape and size, may be formed on the underside of the treadboard to further strengthen same and serve as an additional means for anchoring it in the ground against lateral shifting.

In the above described embodiments it has been assumed that the connecting-heads are provided with only two sets of holes 7, arranged in parallel and normal relation to the treadboard proper, to receive the dowels 6 of the end-plates.

If desired and as shown in Fig. 11, more than two sets of through-holes may be provided in said heads so that the end-plates may be connected in various angular relations to the treadboard, to satisfy different angular positions in which it may have to be placed on the ground to extricate an automobile.

This invention is applied substantially as follows: Assuming that one or both drive-wheels of an automobile have run into a deep depression on the road from which they cannot pull out through their own tractive power, the automobile is backed up sufficiently to enable the placing of the treadboards in the depression, with or without the auxiliary end-plates. When the treadboards are in place, the automobile is driven forward and the wheels thereof, engaging the cleats of said board, will find enough adhesion, or grip, to easily extricate the automobile.

When the end-plates 4 are used, at one or both ends of the treadboards, they are first connected in the proper angular position on the treadboard to suit the contour of the depression and to act either as so-called landings for the wheels or as additional anchorage for the boards. Thus, in Fig. 9, the two end-plates are connected in the position shown in solid lines to act as bottom and top landings. However, if locally required, the end-plates may be placed in either one of the positions shown in broken lines to serve as additional anchoring means.

In the illustration, Fig. 10, only one end-plate is used and connected at the bottom end of the treadboard to act as a landing for the wheel W of an automobile, prior to climbing up said board.

When used to overcome skidding of an automobile over some slippery place on a street, the treadboards are placed flat on the street, as near as possible to the tires, and the automobile driven over them. In this instance, it will generally be found that the end-plates 4 may be dispensed with.

As will be understood, as suggested herein, there may be changes made in the construction and arrangement of the details of this invention without departing from the field and scope of the same, and I intend to include all such variations as fall within the scope of the appended claims, in this application in which the preferred forms only of my invention have been disclosed.

I claim:

1. As an article of manufacture, a treadboard comprising a rigid board, a plurality of cleats positioned transversely of said board and anchorage means formed integrally with said cleats disposed laterally and downwardly of said board, in combination with an end-plate comprising a plate-element; two dowels secured at two adjacent corners thereof; at least one of the end-cleats of said board having a plurality of angularly disposed sets of apertures adapted to be engaged by said dowels to removably hold said end-plate in selected rigid angular relation with said traction-board.

2. As an article of manufacture, a treadboard comprising a rigid board, a plurality of cleats positioned transversely of said board and anchorage means formed integrally with said cleats disposed laterally and downwardly of said board, in combination with an end-plate comprising a plate element and two parallel dowels secured at two adjacent corners of the plate element and in angular relation thereto, each end cleat of said board having a plurality of angularly disposed intersecting sets of apertures adapted to be engaged by said dowels to removably hold said end-plate in rigid selected angular relation with said treadboard.

CHARLES SCHIVINC.